United States Patent [19]

Olmr et al.

[11] Patent Number: 4,972,733
[45] Date of Patent: Nov. 27, 1990

[54] SHOCK ABSORBING GRIP

[75] Inventors: J. Jiri Olmr, Rock Hill; Jack E. Campbell, Fort Mill, both of S.C.

[73] Assignee: Textron Inc, Providence, R.I.

[21] Appl. No.: 282,564

[22] Filed: Dec. 12, 1988

[51] Int. Cl.⁵ ............................................. B62K 21/26
[52] U.S. Cl. .................................. 74/551.9; 81/177.1; 81/177.6
[58] Field of Search ........................... 74/551.8, 551.9; 81/177.1, 177.6, 489, 900; D8/DIG. 7, DIG. 8; 173/162.1, 162.2

[56] References Cited

U.S. PATENT DOCUMENTS

| 599,131 | 2/1898 | King | 74/551.9 |
|---|---|---|---|
| 3,301,335 | 1/1967 | Snelling | 173/162.1 |
| 3,881,554 | 5/1975 | Codley et al. | 173/162.1 X |
| 4,217,677 | 8/1980 | Sumikawa | 74/551.9 X |
| 4,401,167 | 8/1983 | Sekizawa et al. | 173/162.1 |
| 4,471,209 | 9/1984 | Hollander | 74/551.8 X |
| 4,768,406 | 9/1988 | Fitzwater | 81/177.1 |

FOREIGN PATENT DOCUMENTS

| 675170 | 4/1939 | Fed. Rep. of Germany | 74/551.9 |
|---|---|---|---|
| 0109843 | 8/1980 | Japan | 74/551.9 |
| 271547 | 10/1950 | Switzerland | 74/551.9 |
| 1098783 | 6/1984 | U.S.S.R. | 173/162.2 |
| 19995 | of 1903 | United Kingdom | 74/551.9 |
| 465270 | 5/1937 | United Kingdom | 74/551.9 |

Primary Examiner—Vinh T. Luong
Attorney, Agent, or Firm—Abraham Ogman

[57] ABSTRACT

A shock absorbing hand grip comprises an inner elongated resilient tubular wall member adapted to slidably receive a supporting structure and an outer concentric resilient elongated tubular wall member spaced from the inner tubular wall member. A plurality of flexible spacer members are disposed between the inner and outer tubular wall members having a first end attached to the inner tubular wall member and a second end attached to the outer tubular wall member. The flexible spacer members are disposed between the inner and outer tubular wall members at an angle to the axial plane of said tubular members so as to create a region of bending flexure for the spacer member between the inner and outer tubular walls such that shock forces applied to one tubular wall member will cause a bending flexure of the spacer members whereby such shock forces are substantially completely displaced in a non-radial direction to the other tubular wall member.

10 Claims, 4 Drawing Sheets

SHOCK ABSORBING GRIP

BACKGROUND OF THE INVENTION

1. Field of the Invention

The present invention relates to hand grips and more particularly to shock absorbing and isolating hand grips such as are used on hand tools, power tools, bicycles, motorcycles and other implements having handles required to be grasped by an operator when in use.

2. Description of Prior Art

Many devices are known in the prior art for providing hand grips having various features.

For example, U.S. Pat. No. 476,424 dated Jun. 7, 1992 to Smith discloses handle grips formed of separate composite rubber materials having longitudinal radial chambers formed within the grip.

U.S. Pat. No. 593,162 discloses a pneumatic handle for bicycles and analogous vehicles which includes a rubber tubular member having a circular series of longitudinal air cells which are closed at one end and terminate with an air valve at the other end through which air is forced to inflate the air cells and reduce jarring to the hands of the user.

A similar concept is disclosed in U.S. Pat. No. 599,131.

U.S. Pat. No. 3,344,684 dated Oct. 3, 1967 to steere discloses a plastic grip for handle bars formed of two shells which are spaced by projections on one of the shells which contact the other shells.

Other examples of the state of the art can be seen in the following U.S. Pat. Nos.:

1,784,223 dated Dec. 9, 1930 to Crickmer
2,222,121 dated Nov. 19, 1940 to Roberts
2,618,986 dated Nov. 25, 1952 to Hungerford
3,713,350 dated Jan. 30, 1973 to Brilande While such prior art devices provide improvement in the areas intended, there is still a great need to provide a new and improved shock absorbing hand grip of a character which is simple in construction, durable in use, efficient in operation and economical in manufacture.

Accordingly, a principal desirable object of the present invention is to provide a new and improved shock absorbing hand grip having the foregoing characteristics.

Another desirable object of the present invention is to provide a shock absorbing hand grip which can be formed of relatively hard durable elastomeric material while still providing improved shock absorption and isolation within the grip.

A further desirable object of the present invention is to provide an improved radial shock absorbing grip of the character described capable of being applied to handle structures already in use without modifying the same.

A still further desirable object of the present invention is to provide a shock absorbing hand grip which displaces harmful shock forces.

These and other desirable objects of the invention will in part appear hereinafter and will in part become apparent after consideration of the specification with reference to the accompanying drawings and the claims.

SUMMARY OF THE INVENTION

In accordance with the present invention there is disclosed an improved shock absorbing and isolating grip formed of a resilient elastomeric material and comprising an inner elongated resilient tubular wall member adapted to releasably receive a supporting structure, an outer concentric resilient elongated tubular wall member spaced from the inner tubular wall member and a plurality of resilient spacer members disposed radially between the inner and outer tubular wall members and attached thereto. The resilient spacer members are disposed between the inner and outer tubular members at an oblique angle or slanting position to the axial plane of the tubular members. Preferably the resilient spacer members are coextensive with the tubular wall members and configured to form an arcuate or oblique path between the inner and outer tubular wall members. Shock forces applied to one tubular member of the hand grip are substantially completely displaced in a harmless direction to the other tubular member by the resilient spacer members.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF PREFERRED EMBODIMENT(S)

Figure 1:
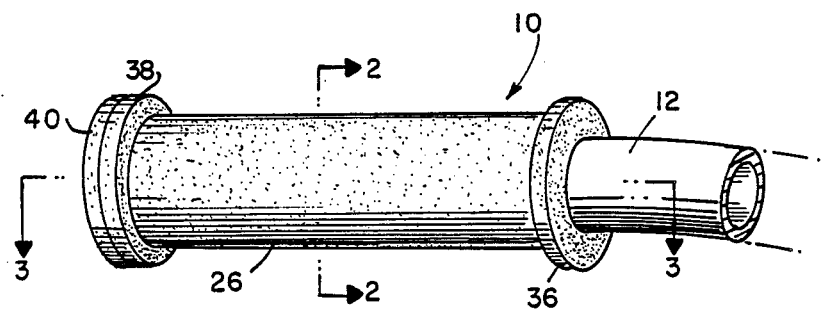
FIG. 1 is a perspective view of a shock absorbing grip in accordance with the present invention mounted on the end portion of a hollow control handlebar.
Figure 2:
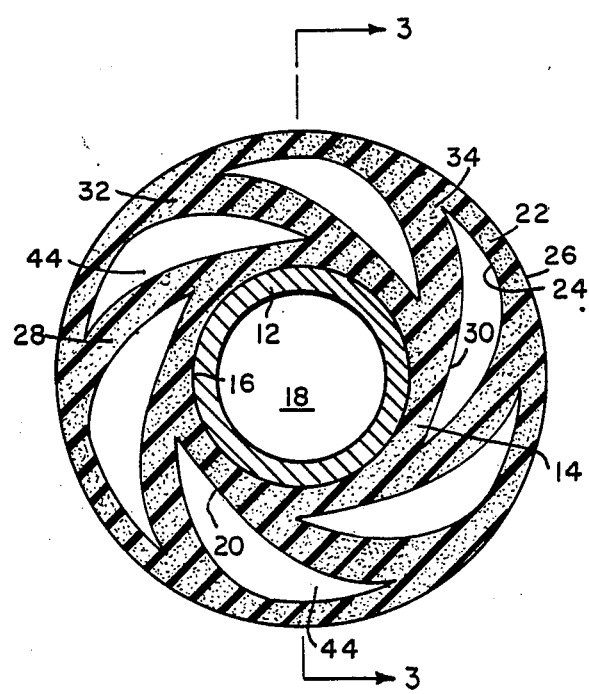
FIG. 2 is an enlarged sectional view taken substantially along the line 2—2 of FIG. 1.
Figure 3:
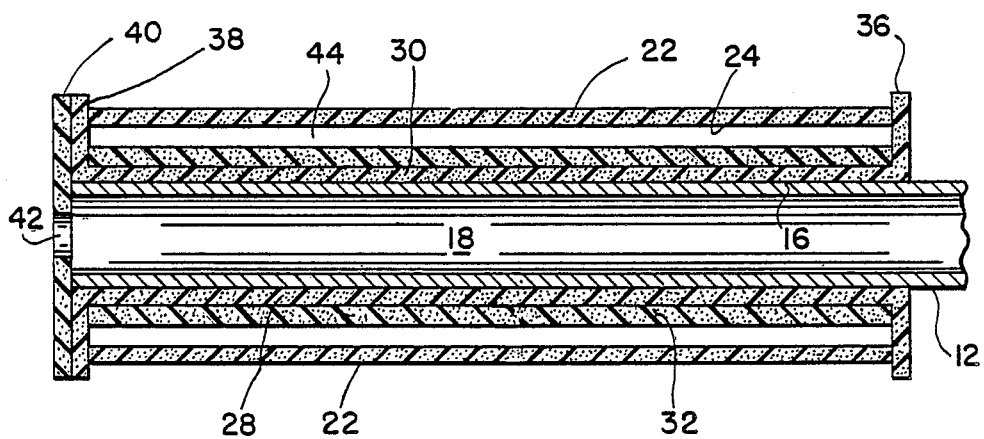
FIG. 3 is an enlarged sectional view taken substantially along the line 3—3 of FIG. 1 and FIG. 2.
Figure 4:
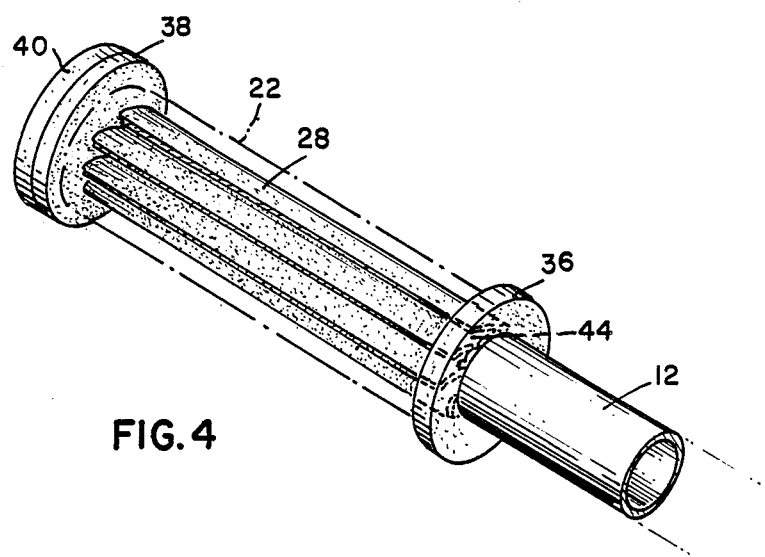
FIG. 4 is a perspective view of the grip of FIG. 1 illustrating the resilient spacer members disposed between the inner and outer tubular walls with the outer wall shown in phantom.

Referring now to FIGS. 1–4 of the drawing, reference numeral 10 indicates generally a shock absorbing grip in accordance with the present invention mounted on the end portion of a hollow control handlebar 12 which is a symbolic representation of handlebars employed on hand tools, power tools, bicycles, motorcycles and other implements having handles required to be grasped by the operator when in use and subject to shock forces incident to operation. The grip 10 is a generally tubular body comprising a resilient inner elongated tubular wall member 14 having an inner surface 16 forming a channel or bore 18 and an outer surface 20. The channel or bore 18 (hereinafter referred to as the bore) is adapted to releasably receive the supporting handlebar 12. An outer concentric resilient elongated tubular wall member 22 is disposed in spaced relationship from the inner tubular wall member 16 and has an inner surface 24 and an outer surface 26.

The inner and outer tubular wall members 14 and 22 are supported in spaced relationship by a plurality of resilient rib or spacer members 28 each having an inner end 30 attached to the outer surface 20 of tubular member 14 and an outer end 32 attached to the inner surface 24 of tubular member 22. The spacer members 28 are circumferentially disposed between the inner and outer tubular members. The spacer members are preferably elongated and coextensive with the inner and outer tubular members 14 and 22. An important feature of the spacer members 28 is that they are disposed between the inner and outer tubular wall members 14 and 22 at an oblique angle to the axial plane of the tubular wall members. As otherwise described, the positions of attachment of the inner end and outer ends 30 and 32 of a spacer member to the inner and outer tubular members 14 and 22 respectively do not lie in the same axial plane. In the preferred embodiment illustrated, the spacer members 28 are formed with a gentle curved or arcuate portion 34 (preferably curved in the direction of the inner tubular member) to provide bending flexure (as discussed further hereinafter), although they may be formed as substantially straight members so long as they are attached obliquely or slantwise between the tubular members. Additionally in the preferred embodiment the area of the outer ends 32 of the spacer members 28 is greater than the area of the inner end 30 and is tangentally attached to the inner surface 24 of the outer tubular member 22. Adjacent spacer members 28 define therebetween a plurality of elongated radial channels or chambers 44, which serve as a region of bending flexure for the spacer members as described hereinafter.

The grip 10 can be provided with terminal collar members 36 and 38 and closure end member 40 having a reduced opening 42 to facilitate the slidable mounting of the grip 10 on the handle 12.

Figure 5:
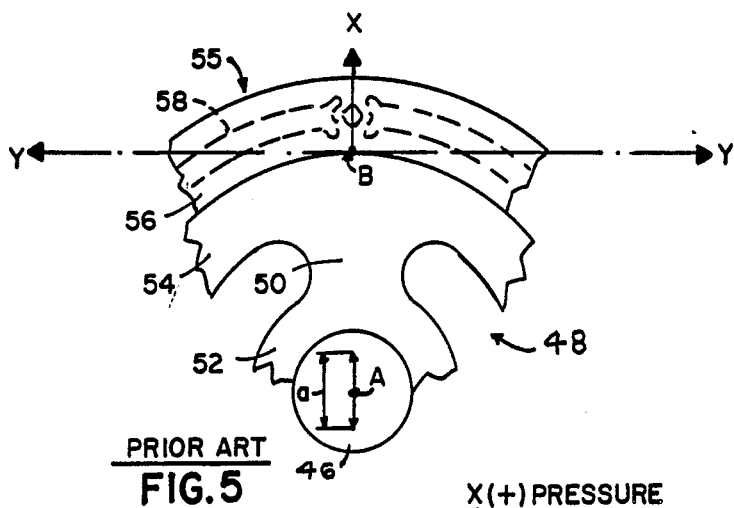
FIG. 5 is a fragmentary schematic representation of a hand grip embodying prior art principles.
Figure 5A:
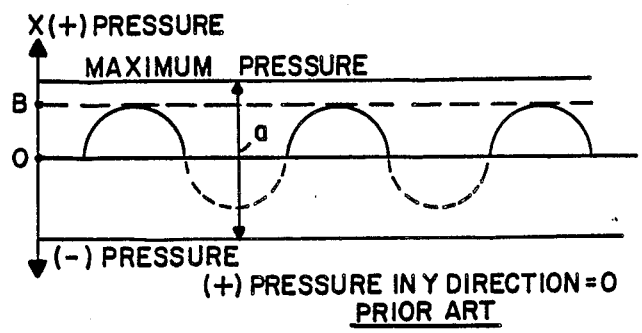
FIG. 5A is a graph useful in describing the prior art of FIG. 5.

Referring now to FIGS. 5 and 5A, there is illustrated an example of a prior art hand grip and the effect when a shock force (load) is applied. The model as illustrated comprises a handlebar 46, a resilient hand grip 48 having conventional ribs or spacer members 50 which are disposed in perpendicular relationship to the inner tubular member 52 and outer tubular member 54. The user's hand 55 is symbolically shown by the area 56 representing the skin and soft tissue and the bone(s) 58 contained therein shown by the dotted lines. For purposes of discussion with respect to FIGS. 5, 5A, 6, and 6A it is assumed that the user's hand 55 is stationary. When point A moves up and down with an amplitude "a" as a result of the pressure of shock forces applied to the handlebar 46, the pressure at point B adjacent the user's hand 55 is equal to the shock pressure times a/2. The displacement of the shock pressure away from the direction of arrow x is zero and the displacement of the shock forces in the direction of the arrow y is also zero. The result is that the user's hand receives the full force of the shock pressure at an angle of substantially 90° to the tangent of the y arrow at point B less a small reduction due to compression of the resilient hand grip material.

Figure 6:
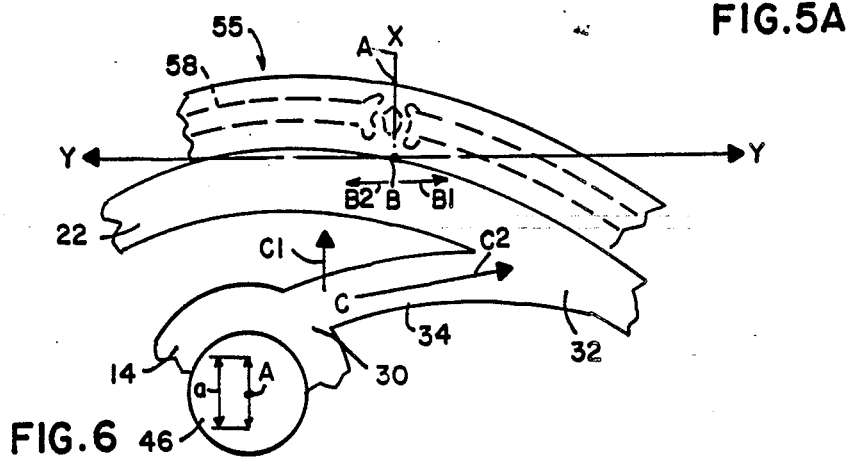
FIG. 6 is a fragmentary schematic representation of a hand grip embodying the principles of the present invention.
Figure 6A:
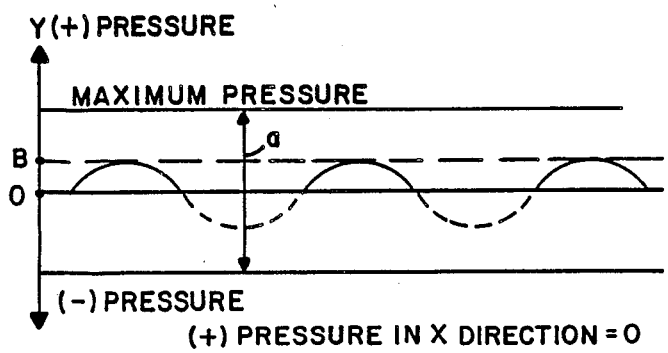
FIG. 6A is a graph useful in describing the invention.

In contrast, referring now to FIGS. 6 and 6A, it was found that with a hand grip configured in accordance with the present invention and with the same shock amplitude a, the shock force(s) or pressure is displaced differently to the advantage of the user. The vertical pressure of a/2 is displaced at point C. Part of the pressure is displaced in the direction of arrow C1 by the resiliency of the spacer 28 at the area of attachment 30 without being transmitted to the outer tubular wall 22. The remaining pressure forces are displaced in the direction of arrow C2. The pressure forces displaced in the direction of arrow C2 are further displaced in the directions of the arrows B1 and B2 by the bending flexure of the spacer member 28 in the direction of arrow B1 and then in the direction of arrow B2 on return flexure. The result is that the harmful shock forces are displaced along the surface of the skin surface of the user's hand, that is, in a direction substantially parallel to the skin of the user's hand in contact with the grip.

Referring now more particularly to FIG. 5A, it can be appreciated that, in accordance with the prior art, the shock forces travelling in the direction of the x arrow are reduced only by the compression of the grip with the result that there is only a small reduction in the shock pressures reaching point B and the hand of the user. None of the shock pressures are dissipated in the direction of the y arrow.

Referring now more particularly to FIG. 6A, the improvement of the present invention can be appreciated. In accordance with the unique configuration of the hand grip of the present invention the pressure forces are dissipated by displacement resulting from the flexing and bending of the spacer members and relative movement of the tubular members. The result is that no shock pressures are transferred to point B in the direction of arrow x. The remaining minimum shock pressures transferred from point C to point B are displaced in the direction of the arrow y and along the surface of the skin of the user's hand.

Another feature of the present invention is that the configuration of hand grip and displacement action thereof rather than compressive action allows the hand grip to be formed of a relatively hard and durable elastomeric material.

The hand grip can be formed from natural and synthetic elastomers. Suitable elastomeric materials for forming the hand grip in accordance with the present invention include, for example, neoprene, nitrile butadiene, vitron, polyurethane, vinyl, nytrel and natural rubbers.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

We claim:

1. A shock absorbing hand grip comprising:
    an inner elongated resilient tubular wall member adapted to releasably receive a supporting structure;
    an outer concentric resilient elongated tubular wall member spaced from said inner tubular wall member; and
    a plurality of elongated flexible spacer members disposed between said inner and outer tubular wall members and having a first end attached to the inner tubular wall member and a second end attached to the outer tubular wall member;
    said flexible spacer members being disposed between said inner and outer tubular wall members at an oblique angle to the axial plane of said tubular members so as to create a region of bending flexure for said spacer members between said inner and outer tubular walls, such that shock forces applied to one tubular wall member will cause a bending flexure of the spacer members, whereby such shock forces are substantially completely displaced in a non-radial direction to the other tubular wall member.

2. A shock absorbing hand grip comprising:

an inner elongated resilient tubular member having a bore to releasably receive a supporting structure;

an outer concentric coextensive resilient tubular member spaced from said inner tubular member; and a plurality of elongated flexible wall members interposed between said inner and outer tubular members and coextensive therewith having a first end attached to the inner tubular member and a second end attached to the outer tubular member;

said flexible wall members being curved from a tangentially extending first end to the second end so as to create a region of bending flexure for said flexible wall members between said inner and outer tubular members, such that shock forces applied to the inner tubular member from the supporting structure will cause a bending flexure of said flexible wall members, whereby such shock forces are displaced in a tangental direction relative to the outer tubular member.

3. The shock absorbing hand grip of claim 2 wherein the grip is formed of an elastomeric material.

4. The shock absorbing hand grip of claim 2 wherein the flexible wall members are curved in the direction of the inner tubular member.

5. The shock absorbing hand grip of claim 2 including a collar member disposed at opposing ends of the tubular members.

6. The shock absorbing hand grip of claim 2 including an end member attached to one end of said tubular members and having a reduced opening to facilitate slidable mounting of the grip onto the supporting structure.

7. A hand grip for devices having a handle required to be gripped by an operator when in use, said grip having a pair of inner and outer tubular members adapted for disposition in surrounding relationship to the handle, said tubular members being disposed in circumferentially spaced relationship to each other, the improvement comprising:

a plurality of circumferentially spaced and longitudinally extending flexible rib members connecting said tubular members together in spaced relationship:

said flexible rib members lying in a obliquely disposed plane relative to the axial plane of said tubular members so as to create a region of bending flexure for said rib members between said inner and outer tubular members, such that shock forces applied to one tubular member will cause a bending flexure of the rib members, whereby such shock forces are substantially completely displaced in a non-radial direction to the other tubular member.

8. The hand grip of claim 7 wherein the grip is formed of an elastomeric material.

9. The hand grip of claim 7 wherein the flexible rib members are curved in the direction of the inner tubular member.

10. The hand grip of claim 7 including a collar member disposed at opposing ends of the tubular members.

* * * * *